United States Patent [19]

Dai et al.

[11] Patent Number: 5,342,507
[45] Date of Patent: * Aug. 30, 1994

[54] MILD HYDROCRACKING PROCESS EMPLOYING CATALYSTS CONTAINING DEALUMINATED Y-ZEOLITES

[75] Inventors: Pei-Shing E. Dai; Charles N. Campbell, II, both of Port Arthur; Bobby R. Martin; David E. Sherwood, Jr., both of Beaumont, all of Tex.

[73] Assignee: Texaco Inc., White Plains, N.Y.

[*] Notice: The portion of the term of this patent subsequent to May 3, 2011 has been disclaimed.

[21] Appl. No.: 46,706

[22] Filed: Apr. 16, 1993

Related U.S. Application Data

[63] Continuation-in-part of Ser. No. 897,165, Jun. 11, 1992, abandoned.

[51] Int. Cl.$^5$ ............................................. C10G 47/02
[52] U.S. Cl. .................................... 208/111; 208/112
[58] Field of Search ................................ 208/111, 112

[56] References Cited

U.S. PATENT DOCUMENTS

| | | | |
|---|---|---|---|
| 4,738,766 | 4/1988 | Fischer et al. | 208/111 |
| 4,789,457 | 12/1988 | Fischer et al. | 208/111 |
| 4,826,587 | 5/1989 | Ward et al. | 208/111 |
| 4,857,169 | 8/1989 | Addo | 208/111 |
| 4,869,803 | 9/1989 | Ward | 208/111 |
| 4,879,019 | 11/1989 | Ward | 208/111 |
| 4,923,592 | 5/1990 | Abdo | 208/111 |
| 4,960,505 | 10/1990 | Minderhound | 208/111 |
| 5,087,348 | 2/1992 | Dai et al. | 208/111 |
| 5,112,473 | 5/1992 | Dai et al. | 208/111 |

*Primary Examiner*—Helane Myers
*Attorney, Agent, or Firm*—Kenneth R. Priem; Richard A. Morgan; Walter D. Hunter

[57] ABSTRACT

A mild hydrocracking process for the hydrodemetallation (HDM), hydrodesulfurization (HDS) and hydroconversion (HC) of hydrocarbon feedstocks such as residuum feedstocks which provides increased conversion of heavy hydrocarbons boiling above 1000° F. into products boiling below 1000° F. as well as increased yields of middle distillates is disclosed. The process utilizes a catalyst comprising about 1.0 to about 6.0 wt. % of an oxide of a Group VIII metal, about 12.0 to about 25.0 wt. % of an oxide of molybdenum and 0 to about 5.0 wt. % of an oxide of phosphorus supported on a porous support comprising precipitated alumina or silica-containing alumina and dealuminated Y-zeolite.

7 Claims, No Drawings

MILD HYDROCRACKING PROCESS EMPLOYING CATALYSTS CONTAINING DEALUMINATED Y-ZEOLITES

CROSS REFERENCE TO RELATED APPLICATION

This application is a Continuation-in-Part of application Ser. No. 07/897,165, filed Jun. 11, 1992 now abandoned. This application is related to U.S. patent application Ser. No. 07/897,167 for Mild Hydrocracking Process Using Catalysts Containing Dealuminated Y-Zeolites of Dai et al., filed Jun. 11, 1992.

BACKGROUND OF THE INVENTION

1. Field of the Invention

This invention relates to a catalytic process for mild hydrocracking of heavy oils. More particularly, this invention relates to a mild hydrocracking process for the hydrodemetallation (HDM), hydrodesulfurization (HDS) and hydroconversion (HC) of a heavy hydrocarbon feedstock boiling above 650° F., such as vacuum gas oil (VGO) and VGO containing a high proportion of vacuum resid (VR) to lighter distillate products boiling at or below 650° F.

In the mild hydrocracking process of this invention a sulfur- and metal-containing hydrocarbon feedstock, such as residua containing heavy oils, is contacted at an elevated temperature with hydrogen and a catalyst composition comprising a specified amount of a Group VIII metal, such as an oxide of nickel or cobalt, a specified amount of an oxide of molybdenum and, optionally, a specified amount of an oxide of phosphorus, such as phosphorus pentoxide supported on a porous alumina support containing a dealuminated Y-zeolite. In the catalytic mild hydrocracking process of this invention the sulfur- and metal-containing hydrocarbon feed is contacted with hydrogen and the catalyst containing dealuminated Y-zeolite, which has a specified pore size distribution, in a manner such that an increased production of middle distillates and a substantially higher conversion of the 1000° F.+ fraction of the hydrocarbon feed to the 1000° F.− lighter products is achieved over that obtained with the use of prior art hydroprocessing catalysts while high levels of sediment formation are avoided.

2. Prior Art

U.S. Pat. No. 4,600,498 (Ward) teaches a process for mild hydrocracking a hydrocarbon oil having a substantial proportion of components boiling below about 100° F. which comprises contacting the hydrocarbon oil under conditions of elevated temperature and a hydrogen pressure less than about 1500 psig with a particulate catalyst comprising at least one hydrogenation component, a Y-zeolite having a unit cell size between about 24.40 and 24.64 Å and a dispersion of silica-alumina in a matrix consisting essentially of alumina.

U.S. Pat. No. 4,894,142 (Steigleder) discloses a highly selective hydrocracking process providing increased yields of middle distillates. The process employs a catalyst comprising a hydrogen form Y-type zeolite having a unit cell size between about 24.20 Angstroms and 24.40 Angstroms, a metal hydrogenation component and refractory oxide support materials. The catalyst is characterized by low ammonia temperature programmed desorption (TPD) acidity strength which may be achieved by dehydroxylation caused by a dry calcination.

U.S. Pat. No. 4,430,200 (Shihabi) discloses hydrocarbon conversion catalysts having reduced aging rates and exhibiting lower gas yield in conversion processes made by pre-steaming a large pore, high silica zeolite such as mordenite or zeolite Y and base-exchanging the steamed zeolite with an alkali metal to reduce the acidity to a low value.

U.S. Pat. No. 4,654,454 (Barri, et al.) discloses a process for converting $C_2$ to $C_5$ hydrocarbons to aromatic hydrocarbons which comprises bringing the hydrocarbon into contact with a surface dealuminated zeolite loaded with a gallium compound.

U.S. Pat. No. 4,533,533 (Dewing, et al.) discloses a process for selective and controlled dealumination of an alumino silicate zeolite by heating a zeolite having pores filled with coke in air at a temperature of 450° F.–650° F. The partially dealuminated zeolite is useful in toluene disproportionate processes.

U.S. Pat. No. 5,069,890 (Dai, et al.) discloses novel treated zeolite, such as Y-zeolite, prepared by treating charge zeolite, such as a dealuminated Y-zeolite (which is essentially free of Secondary Pores), with steam for 5–60 hours at 1000° F.–1500° F. Product is particularly characterized by increased Secondary Pore Volume (pores of diameter of 100 Å–600 Å) in amount of as high as 0.20 cc/g and is useful in resid hydroprocessing.

U.S. patent application Ser. No. 07/533,222, filed Jun. 4, 1990 of Dai, et al., now U.S. Pat. No. 5,112,473, discloses a process for preparing acidified dealuminated Y-zeolites prepared, for example, by treating a dealuminated Y-zeolite with an acidic medium, such as an aqueous solution of an inorganic acid.

U.S. Pat. No. 5,053,374 (Absil, et al.) discloses low acidity refractory oxide-bound zeolite catalysts, for example, silica-bound ultrastable Y-zeolite, possessing physical properties, e.g., crush strength similar to those of their alumina-bound counterparts, and since low acidity refractory oxide-bound catalysts are inherently less active than alumina-bound zeolite catalysts, the former are particularly useful in hydrocarbon conversion processes in which reduced coke make increased catalyst cycle length. Due to their stability in acid environments, the low acidity refractory oxide-bound zeolite extrudate can be acid treated without unduly comprising structural integrity.

U.S. Pat. No. 4,919,787 (Chester, et al.) discloses an improved method for passivating metals in a hydrocarbon feedstock during catalytic cracking which involves contacting the feedstock with a passivating agent comprising a precipitated porous rare earth oxide, alumina, and aluminum phosphate precipitate. The passivating agent may be coated on a cracking catalyst, such as dealuminated Y-zeolite. Y-zeolite, etc., be part of the matrix of a cracking catalyst, or be added to the cracking operations as discrete particles.

U.S. Pat. No. 5,037,531 (Bundens, et al.) discloses a catalytic cracking process using a catalyst comprising a framework dealuminated Y-zeolite which is rare earth and aluminum exchanged.

SUMMARY OF THE INVENTION

The instant invention is a process of mild hydrocracking of a sulfur- and metal-containing hydrocarbon feedstock having a substantial proportion of components boiling below about 1000° F., such as residue, vacuum gas oils, etc., which comprises contacting the feedstock at an elevated temperature and at a pressure of less than 1500 psig with hydrogen and a catalyst which comprises about 1.0 to about 6.0 wt. %, preferably about 2.5 to about 3.5 wt. % of an oxide of a Group VIII metal, preferably nickel or cobalt; about 12.0 to about 25.0 wt. %, preferably about 12.0 to about 18.0 wt. % of an oxide of molybdenum; about 0 to about 5.0 wt. %, preferably about 0.1 to about 3.0 wt. % of an oxide of phosphorus, preferably $P_2O_5$, all supported on a porous support comprising (1) a matrix selected from the group consisting of precipitated alumina and silica-alumina containing about 1.0 to about 3.0 wt. % silica, and (2) about 5.0 to about 35.0 wt. %, based on the weight of the support, of a dealuminated Y-zeolite having a silica to alumina mole ratio 10 to 32 and a unit cell size of 24.29 Å to 24.48 Å, which zeolite is characterized by the presence of secondary pores of diameter of about 100 Å–600 Å.

The catalyst is characterized by having a total surface area of about 200 to about 350 m²/g and a total pore volume of about 0.55 to about 0.75 cc/g, preferably about 0.60 to about 0.72 cc/g, with a pore volume distribution such that micropores having diameters of 100–160 Å constitute about 10 to about 55%, pores having diameters greater than 160 Å constitute about 25 to about 55%, of the total pore volume of the catalyst and macropores having diameters greater than 250 Å constitute about 15 to about 45% of the total pore volume. The catalyst is further characterized by having about 50 to about 65% of the total pore volume in pores of diameters from about 20 Å below the pore mode diameter to about 20 Å above the pore mode diameter, and the pore mode diameter is in the range of about 65 to about 120 Angstroms, as measured by mercury porosimetry using a Micromeritic instrument, Autopore 9220 V 2.03.

The dealuminated Y-zeolites employed in preparing the catalyst support are further characterized by having the total pore volume of secondary pores of diameter greater than 100 Å of at least 0.08 cc/g, which correspond to 45% of total pore volume and the pore mode of the secondary pores is in the range of 105–130 Å. The catalyst support has a modified monomodal pore size distribution optimized for reducing the sediment make.

This invention also relates to the catalyst employed in the described process. The molybdenum gradient of the catalyst ranges from about 1 to about 10, preferably from about 1.0 to about 5.0.

The operating conditions for the process of the instant invention are such as to yield about a 10 to about a 60 Vol % conversion of the hydrocarbon feedstock boiling at 650° F.+ to hydrocarbon products boiling at 650° F.−.

The residuum feedstocks may be contacted with hydrogen and the catalyst utilizing a wide variety of reactor types. Preferred means for achieving such contact include contacting the feed with hydrogen and the prescribed catalyst in a fixed bed hydrotreater, in a single continuous-stirred-tank reactor or single ebullated-bed reactor, or in a series of 2–5 continuous-stirred-tank or ebullated-bed reactors, with ebullated-bed reactors being particularly preferred, the process of the instant invention is particularly effective in achieving high conversion rates with increased production of middle distillate and 1000° F.− fractions having the desired degree of hydrodesulfurization (HDS) while at the same time the sediment make is maintained at a level similar to that resulting from the use of conventional bimodal alumina-based catalysts.

DESCRIPTION OF THE PREFERRED EMBODIMENTS

The decreasing demand for heavy fuel oils has caused refiners to seek ways to convert heavier hydrocarbon feedstocks to lighter products of more value. To increase mid-distillate production as well as to increase the conversion of the 1000° F.+ fraction to the 1000° F.− fraction, the refiner has several process options. They include hydrocracking, fluid catalytic cracking, and coking, which all require heavy investments in the refineries. Because of such high costs, refiners are continually searching for conversion processes which may be utilized in existing units. An additional option available to refiners is to employ a mild hydrocracking (MHC) process. MHC process is an evolution of the VGO hydrodesulfurization (HDS) process. The main feedstock for this MHC process is VGO but other types of heavy gas oils, such as coker gas oils and deasphalted oils, can be used.

The major advantage of MHC is that it can be carried out within the operating constraints of existing VGO hydrotreaters. The typical conditions for the MHC process are: Temperature: 720°–780° F., Hydrogen Pressure: 600–1200 psig, $H_2$/Oil Ratio: 1000–2000 SCF/BBL, Space Velocity: 0.4–1.5 Vol/Vol/Hr. In contrast, true high conversion hydrocracking units are operated at three conditions: Temperature: 700°–900° F., Hydrogen Pressure: 1800–3000 psig, $H_2$/Oil Ratio: 1400–8000 SCF/BBL, Space Velocity: 0.3–1.5 Vol/Vol/Hr. The major difference between the two processes is the hydrogen pressure.

The products obtained from the MHC process are low sulfur fuel oil (60–80%) and middle distillate (20–40%). This hydrotreated fuel oil is also an excellent feed for catalytic cracking because of its higher hydrogen content and lower nitrogen content compared to the original feed. The quality of diesel cut produced by MHC is usually close to diesel oil specifications for the cetane index, and so can be added to the diesel pool.

The switch from a HDS mode to a MHC mode can be achieved in different ways, assuming that the refiner is equipped to recover the surplus of the middle distillate fraction. One way to increase middle distillate production from a unit loaded with HDS catalyst is to increase the operating temperature. Using a conventional hydrotreating catalyst, the MHC process typically converts about 10 to 30 Vol % of hydrocarbon feedstock boiling above 650° F. (650° F.+) to middle distillate oils boiling at or below 650° F. (650° F.−).

Another way to increase the middle distillate production is to change, at least partly, a HDS catalyst from a nonacidic alumina support to a slightly acidic catalyst. Catalysts of higher hydrogenation activity and/or hydrocracking activity are still being sought. The higher the activity of the catalyst the lower the temperature required to obtain a product of given sulfur, nitrogen or metal content in any given boiling range. For the VGO containing a high proportion of residuum, an HDS catalyst usually gives less than 10 Vol % conversion of the 650° F.− fraction. The conversion of resid components boiling above 1000° F. (1000° F.+) into products boiling at or below 1000° F. (1000° F.−) with the known alumina-based hydrotreating catalysts is achieved primarily by thermal cracking reactions.

A particular difficulty which arises in resid hydroprocessing units employing the currently known catalysts is the formation of insoluble carbonaceous substances (also called sediment) when the conversion is high (above 50 Vol %). High sediment may cause plugging of reactor or downstream units, such as a fractionation unit. The higher the conversion level for a given feedstock, the greater the amount of sediment formed. This problem is more acute at a low hydrogen pressure and high reaction temperature.

The process of the instant invention employs a catalyst composition comprising about 1.0–6.0, preferably 2.5–3.5 wt % of an oxide of a Group VIII metal, preferably nickel or cobalt, most preferably NiO, about 12.0 to about 25.0 wt %, preferably about 12.0 to about 18.0 wt % of an oxide of molybdenum, about 0 to about 5.0 wt % preferably 0.1 to about 3.0 wt % of an oxide of phosphorus, preferably $P_2O_5$, all supported on a support comprising (1) a matrix selected from the group consisting of precipitated alumina and alumina containing about 1.0 to about 3.0 wt % silica, and (2) about 5.0 to about 35 wt %, based on the weight of the support, of a dealuminated Y-zeolite having a silica to alumina mole ratio of 10 to 32 and a unit cell size of 24.29 to 24.48 Å which zeolite is characterized by the presence of secondary pores of diameter of about 100 Å–600 Å.

The catalyst is characterized by having a total surface area of about 200 to about 350 m$^2$/g and a total pore volume 0.55 to about 0.75 cc/g, preferably about 0.60 to about 0.70 cc/g with a pore volume distribution such that micropores having diameters less than 100 Å constitute less than 40%, pores having diameters of 100–160 Å constitute about 10 to about 55%, pores having diameters greater than 160 Å constitute about 15 to about 50%, of the total pore volume of the catalyst and macropores having diameters greater than 250 Å constitute about 15 to about 50%, preferably about 15 to about 45% of the total pore volume.

The catalyst is also further characterized by having about 40 to about 65% of the total pore volume in pores of diameters from about 20 Angstroms below the pore mode diameter to about 20 Å above the pore mode diameter and the pore mode diameter is in the range of about 65 to about 120 Å as measured by mercury porosimetry.

Group VIII, as referred to herein, is Group VIII of the Periodic Table of Elements. The Periodic Table of Elements referred to herein is found on the inside cover of the CRC Handbook of Chemistry and Physics, 55th Ed. (1974–75). Other oxide compounds which may be present include $SO_4$ (present in less than 0.8 wt. %), and $Na_2O$ (present in less than 0.1 wt. %). The above-described support may be purchased or prepared by methods well known to those skilled in the art.

The charge dealuminated Y-zeolites which may be employed in preparing the catalysts of this invention are typically characterized by various properties including pore size, unit cell size, silica to alumina mole ratio, etc. which properties are more completely described below.

Primary Pore Size—The primary pores are small pores characterized by a pore diameter of less than about 100 Å, and typically 20 Å–40 Å, say 23 Å. These small pores or micropores are commonly present together with super micropores having a pore diameter of 40 Å–100 Å. Pore size is measured by nitrogen desorption isotherm.

Primary Pore Volume—The volume of the primary pores (including micropores and super micropores) is typically 0.08–0.14 cc per gram. Primary Pore Volume is measured by nitrogen desorption isotherm.

Lattice Constant—The unit cell size (or lattice constant) of the dealuminated Y-zeolites which may be utilized in preparing the catalysts of this invention generally will be from 24.34 Å–24.56 Å. Unit cell size is measured by X-ray diffraction.

Secondary Pore Size—The secondary pores are large pores characterized by a pore size (diameter) of greater than 100 Å, and typically 100 Å–600 Å. Secondary pore mode is measured by the nitrogen desorption isotherm.

Secondary Pore Volume—The useful dealuminated Y-zeolites are characterized by having a secondary pore volume. Typical secondary pore volumes are above 0.01 cc/g and commonly in the range of 0.02–0.12 cc/g. Secondary pore volume is measured by the nitrogen desorption isotherm.

Total Pore Volume—The total pore volume of the dealuminated Y-zeolites which may be employed in preparing the catalysts of this invention ranges from 0.11–0.23 cc/g (as measured by the nitrogen adsorption isotherm).

Total Surface Area—The total surface area of the dealuminated Y-zeolites which may be utilized in preparing the catalysts of this invention range from 500–700 m/g (as measured by Brunauer-Emmett-Teller (BET) Technique).

Crystallinity—The crystallinity of the useful dealuminated Y-zeolites range from about 70 to about 100% (as measured by X-ray diffraction).

Silica-to-Alumina Mole Ratio—The silica-to-alumina mole ratio of the useful dealuminated Y-zeolites ranges from 6–20. This is equivalent to a silicon-to-aluminum atom ratio of 3–10.

Surface Si:Al Atom Ratio—The Surface Si:Al Atom Ratio of the suitable dealuminated Y-zeolites (as measured by X-ray photo electron spectroscopy) ranges from 1.4–5. This is the ratio which prevails over a depth of 50 Å on the surface of the particle.

Acid-Site Density—The acid site density of the suitable dealuminated Y-zeolites will vary from 5–30 cc $NH_3$/gram of catalyst (as measured by temperature programmed desorption of ammonia (TPD)).

Acid Resistance—The acid resistance of the dealuminated Y-zeolites which may be employed in preparing the catalysts of this invention will range from 80%–100% (as measured by loss of zeolite crystallinity in contact with a standard acid solution).

Dealuminated Y-zeolites useful in preparing the catalyst of this invention may include a dealuminated Y-zeolite selected from the group consisting of (i) ammonium form of dealuminated Y-zeolite having a silica to alumina mole ratio of 6–20, (ii) a hydrogen form of dealuminated Y-zeolite having a silica to alumina mole ratio of 6–20, (iii) a metal exchanged dealuminated Y-zeolite having a silica to alumina mole ratio of 6–20 and a lattice constant of 24.34 to about 24.56 Å, which charge is particularly characterized by the presence of secondary pores of diameter of about 100–600 Å.

As previously pointed out, the useful dealuminated Y-zeolites may include those characterized by a silica to alumina mole ratio of 6–20, preferably 7–18 and a Lattice Constant of 24.34 to about 24.56 Å, preferably 24.34 to about 24.47 Å.

Dealuminated Y-zeolites which may be employed may include ultrastable Y-zeolites, superultrastable Y-zeolite, etc. Ultrastable zeolites are $NH_4+$ exchanged dealuminated Y-zeolites. Superultrastable zeolites are H+ form of steamed ultrastable Y-zeolites.

Dealuminated Y-zeolites useful in preparing the catalysts of this invention may be preferably in the hydrogen form, the ammonium form, or more preferably in an exchanged form, i.e., a form in which any alkali metal present has been exchanged for e.g., one or more rare earth metals. Alkali metal is present preferably in amount of less than about 0.5 wt. %. The preferred form is the commercial hydrogen form.

Illustrative commercially available dealuminated Y-zeolites which may be utilized in preparing the catalysts of this invention may include the following, the properties of which are set forth in Table I which follows.

TABLE I

| CHARGE ZEOLITE PROPERTIES | | | |
|---|---|---|---|
| | ZEOLITE | | |
| Property | A | B | C |
| Primary Pore Size A | 85 | 39 | 23 |
| Primary Pore Volume cc/g | 0.11 | 0.11 | 0.08 |
| Lattice Constant | 24.35 | 24.37 | 24.56 |
| Secondary Pore Mode (A) | none | 115 | none |
| Secondary Pore Volume cc/g | 0.12 | 0.12 | 0.02 |
| Total Pore Volume cc/g | 0.23 | 0.23 | 0.11 |
| Total Surface Area m$^2$/g | 580 | 620 | 683 |
| Crystallinity % | 87 | 74 | 100 |
| SiO$_2$ to Al$_2$O$_3$ | | | |
| Mole Ratio (XRD) | 18 | 16 | 6 |
| Acid Site Density cc/g | 6.5 | 13 | 28.9 |

A. The Valfor CP 300-35 brand of super ultrastable Y-zeolite of PQ Corp. (a hydrogen form zeolite).
B. The Valfor CP 304-37 brand of super ultrastable Y-zeolite of PQ Corp. (an ammonium exchanged form zeolite).
C. The Valfor CP 300-56 brand of ultrastable Y-zeolite of PQ Corporation an ammonium form zeolite).
A preferred zeolite for use in making the catalysts of this invention is a zeolite such as the CP 300-35 brand of Y-type zeolite of PQ Corp.

Preparation of Zeolite/Alumina Supports

There are no specific limitations as to the method by which precipitated alumina or 2% silica-containing alumina and zeolites are mixed. Zeolites may be added in the course of the preparation of aluminas, the dried alumina and zeolite powders may be kneaded together, or zeolite may be immersed in a solution of aluminum compound, followed by addition of an appropriate amount of basic substance to effect precipitation of alumina or silica-containing alumina onto the zeolite.

EXAMPLE 1

Preparation of Zeolite/Alumina Support SN-6572X 2 kg of Catapal ® B alumina powder was combined with 1 kg of water in a 2.5 gal. mix-muller. The mixture was mulled for one hour, then one half of the mull mix was removed. To the remaining mull mix, 365 g of Valfor ® CP-300-35 brand of super ultrastable Y-zeolite of the PQ Corporation (hydrogen form) and 385 g of water were added. The mixture was mulled for one hour, then the mull mix was extruded through a die plate with 1/32" circular openings. The extrudates were dried at 200° F. for one hour in flowing air, then calcined at 1100° F. for one hour in a muffle furnace. The composition of the resulting extrudes was 20 wt. % Y-zeolite/80 wt. % alumina. The properties of support are set forth in Table II which follows. The unit cell size of the charge CP-300-35 zeolite was 24.34 Å, whereas, in the resulting zeolite/alumina extrudates (i.e., the support) was 24.29 Å. The result indicated that dealumination reaction took place during the preparation of extrudates.

EXAMPLE 2

Preparation of Zeolite/Alumina Support SN-6571-X 814 g of Catapal ® B alumina powder and 186 g of CP-300-56 ultrastable Y-zeolite of the PQ Corporation were mixed in a muller. 3.7 g of nitric acid was added to 500 g water. This diluted nitric acid solution was added to the mixture. The mixture was mulled for 30 minutes, and the mull mix was extruded through a 1/32" die. The extrudates were dried at 250° F. overnight in flowing air, then calcined at 1100° F. for 3 hours in a muffle furnace. The resulting support comprised 20 wt. % Y-zeolite and 80 wt. % alumina. The physical properties of the support SN-6571-X are also presented in Table II. The unit cell size of the zeolite present in the extrudates was 24.48 Å compared to 24.56 Å for the charge CP-300-56 zeolite. The silica/alumina mole ratio increased from 6 to 10.

TABLE II

| ZEOLITE/ALUMINA SUPPORTS | | |
|---|---|---|
| Support | SN-6571X | SN-6572X |
| TPV, cc/g | 0.78 | 0.77 |
| PV >250Å cc/g | 0.14 | 0.14 |
| PV >160Å cc/g | 0.20 | 0.19 |
| PV <160Å cc/g | 0.59 | 0.58 |
| PV <100Å cc/g | 0.41 | 0.42 |
| PV 100-160Å cc/g | 0.17 | 0.16 |
| (% of TPV) | 22 | 20 |
| PM at (dv/dD) max Å | 86 | 86 |
| PM (BET), Å | 99 | 99 |
| Surf. Area, m$^2$/g | 318 | 306 |
| Zeol. Content, wt. % | 19 | 16 |
| UCS, Å | 24.48 | 24.29 |
| SiO$_2$/Al$_2$O$_3$ | 10 | 32 |

EXAMPLES III–IV

Preparation of Zeolite/Alumina Supports

Following the procedures similar to those described in Example 1, the Valfor ® CP-304-37 brand of super ultrastable Y-zeolite of PQ Corporation (an ammonium exchanged form) having a unit cell size of 24.37 Å was used in the preparations of the supports of Examples III and IV. The unit cell size of the resulting zeolite/alumina extrudates was 24.34 Å. The properties of the supports of Examples III and IV are set forth in Table III.

EXAMPLES V and VI

Preparation of Zeolite/Alumina Supports

In Examples V and VI supports prepared with Valfor ® CP-300-56 brand of ultrastable Y-zeolite of the PQ Corporation (an ammonium form), were used to further illustrate the pore volume distributions of the zeolite/alumina supports. The properties of these supports are set out in Table III.

TABLE III

| PROPERTIES OF ZEOLITE/ALUMINA SUPPORTS | | | | |
|---|---|---|---|---|
| | Example III | Example IV | Example V | Example VI |
| Charge Zeolite | B* | B* | C* | C* |
| Zeolite Content, wt. % | 17 | 15 | 19 | 16 |
| UCS, Å | 24.34 | 24.34 | 24.34 | 24.34 |
| Surf. Area, m$^2$/g | 367 | 356 | 377 | 353 |
| TPV, cc/g | 0.80 | 0.77 | 0.79 | 0.74 |

TABLE III-continued

| PROPERTIES OF ZEOLITE/ALUMINA SUPPORTS | | | | |
|---|---|---|---|---|
| | Example III | Example IV | Example V | Example VI |
| PV >250Å, cc/g | 0.06 | 0.06 | 0.06 | 0.04 |
| PV >160Å, cc/g | 0.10 | 0.11 | 0.10 | 0.08 |
| PV <160Å, cc/g | 0.70 | 0.66 | 0.69 | 0.66 |
| PV <100Å, cc/g | 0.47 | 0.41 | 0.42 | 0.32 |
| PM (BET), Å | 83 | 88 | 89 | 99 |
| PV, 100–160Å, cc/g | 0.23 | 0.25 | 0.27 | 0.34 |
| (as % of TPV) | 29% | 32% | 35% | 46% |

Catalyst Preparation

In preparing the catalyst the above-described support is impregnated with the requisite amounts of molybdenum oxide, Group VIII metal oxide and phosphorus oxide via conventional means known to those skilled in the art to yield a finished catalyst containing a Group VIII metal oxide in the amount of 1.0 to about 6.0 wt. %, preferably about 2.5 to about 3.5 wt. %, molybdenum oxide in the amount of 12.0 to about 25.0 wt. %, preferably 12.0 to about 18.0 wt. % and phosphorus oxide in the amount of about 0 to about 5.0 wt. %, preferably 9 to about 2.0 wt. %.

The Group VIII metal may be iron, cobalt or nickel which is loaded on the support, for example, as a 10–30 wt. %, preferably about 15 wt. % of an aqueous solution of metal nitrate. The preferred metal of this group is nickel which may be employed at about 16 wt. % aqueous solution of nickel nitrate hexahydrate. Molybdenum may be loaded on the support employing, for example, a 10–20 wt. %, preferably about 15 wt. %, of an aqueous solution of ammonium heptamolybdate (AHM). The phosphorus component may be derived from 85% phosphoric acid.

The active metals and phosphorus may be loaded onto the catalyst support via pore filling. Although it is possible to load each metal separately, it is preferred to impregnate simultaneously with the Group VIII metal and molybdenum compounds, phosphoric acid, as well as with stabilizers such as hydrogen peroxide and citric acid (monohydrate), when employed. It is preferred that the catalyst be impregnated by filling 95–105%, for example, 97% of the support pore volume with the stabilized impregnating solution containing the required amount of metals and phosphorus.

Finally, the impregnated support is oven-dried and then directly calcined preferably at 1000°–1150° F. for about 20 minutes to 2 hours in flowing air.

A hydroconversion process, such as a mild hydrocracking process, which preferentially removes sulfur and nitrogen from the converted product stream with components having boiling points less than 1000° F. is desirable in those instances where there is less concern over the quality of the unconverted product stream, but, rather, where the primary concern is the quality of the distillate product from the hydroconversion process. It is well known to those skilled in the art that high heteroatom contents of distillate hydroconversion products have an adverse effect on fluid catalytic cracking of the heavier gas oils (having a boiling point of about 650° F. to about 1000° F.) and that extensive hydrotreating of the distillate streams would be required to meet the strict mandated levels of heteroatoms in distillate fuels. The demands placed upon catalyst compositions make it difficult to employ a single catalyst in a hydroconversion process, such as a mild hydrocracking process, which will achieve effective levels of sulfur and nitrogen removal from the converted product stream having components with boiling points below 1000° F. However, the catalyst employed in the process of the instant invention is capable of achieving such results because the prescribed catalyst has an optimized micropore diameter to overcome the diffusion limitations for hydrotreatment of the converted product molecules but it also does not contain such large macropores that would allow poisoning of the catalyst pellet interior. The catalyst also has a very narrow pore size distribution such that pores with diameters less than 150 Angstroms are minimized as these pores are easily plugged with contaminants during hydroprocessing.

Catalyst Examples SN-6447, SN-6448, SN-6572, SN-6910 and SN-6912, the properties of which are described in Table IV below, are catalysts prepared in the manner set out above, which may be employed in the MHC process of this invention. These catalysts were prepared with a support containing dealuminated Y-zeolite obtained from American Cyanamid which is available in the form of extrudates in the diameter range of 0.035–0.041 inch.

TABLE IV

| NiMoP CATALYSTS ON ALUMINA SUPPORTS CONTAINING DEALUMINATED Y-ZEOLITE | | | | | |
|---|---|---|---|---|---|
| CATALYST | SN-6447 | SN-6448 | SN-6572 | SN-6910 | SN-6912 |
| Impreg. Sol'n. | Ni—Mo—P | Ni—Mo—P | Ni—Mo—P | Ni—Mo—P | Ni—Mo—P |
| $SiO_2$, wt. %$^a$ | 2.0 | 0 | 0 | 2.0 | 2.0 |
| $P_2O_5$, wt. % | 2.3 | 2.7 | 1.5 | 1.6 | 1.6 |
| $MoO_3$, wt. % | 14.4 | 14.3 | 15.0 | 15.6 | 15.6 |
| NiO, wt. % | 2.9 | 2.9 | 2.9 | 2.9 | 2.9 |
| Pore Volume Distribution by Hg Porosimetry: Surface Area by $N_2$BET | | | | | |
| Total PV, cc/g | 0.69 | 0.71 | 0.61 | 0.70 | 0.66 |
| PV >250Å, % TPV | 43.5 | 33.8 | 18.0 | 28.6 | 25.8 |
| PV >160Å, % TPV | 49.3 | 40.8 | 27.9 | 32.9 | 31.8 |
| PV <160Å, % TPV | 50.8 | 59.2 | 72.3 | 65.7 | 69.7 |
| PV <100Å, % TPV | 36.2 | 29.6 | 19.7 | 25.9 | 56.1 |
| PV 100–160Å, % TPV | 15.0 | 30.0 | 52.0 | 14.0 | 13.0 |
| PV in PM ± 20Å, % TPV | 40.7 | 45.2 | 58.6 | 44.8 | 51.0 |
| PM at (dv/dD) max Å | 70 | 95 | 110 | 75 | 69 |
| PM(BET)Å | 69 | 82 | 94 | 64 | 57 |
| Surf. Area, m²/g | 308 | 238 | 242 | 316 | 324 |
| HDS-MAT, $C_{0.5g'}$ % | 60 | 69 | 87 | 89 | 91 |
| Zeolite Properties in the Finished Catalysts | | | | | |
| Zeolite Content, | 12 | 12 | 12 | 9 | 9 |

TABLE IV-continued
NiMoP CATALYSTS ON ALUMINA SUPPORTS CONTAINING DEALUMINATED Y-ZEOLITE

| CATALYST | SN-6447 | SN-6448 | SN-6572 | SN-6910 | SN-6912 |
|---|---|---|---|---|---|
| wt. % | | | | | |
| Zeolite Type | C*** | C*** | A* | B** | B** |
| UCS Angstroms | 24.43 | 24.43 | 24.29 | 24.34 | 24.37 |
| $SiO_2/Al_2O_3$ ratio | 12 | 12 | 32 | 20 | 17 |
| Metals Distribution by XPS Analysis | | | | | |
| Mo Gradient | 1.2 | 1.2 | 1.3 | 0.93 | 0.99 |
| Ni Gradient | 1.0 | 1.2 | 1.3 | 1.40 | 0.91 |
| $(Mo/Al)_{int}$ | 0.13 | 0.12 | 0.14 | 0.12 | 0.13 |
| $(Ni/Al)_{int}$ | 0.013 | 0.012 | 0.016 | 0.009 | 0.011 |

A* - Zeolite was Valfor CP 300-35 SUSY brand of hydrogen form super ultrastable Y-zeolite of PQ Corp.
B** - Zeolite was Valfor CP-304-37 SUSY brand of ammonium form very low soda super ultrastable, dealuminated Y-zeolite of PQ Corp.
C*** - Zeolite was Valfor CP 300-56/YSY brand of ammonium form ultrastable Y-zeolite of PQ Corp.
$^q$in Table II the silica value is based on the wt. % of silica in the support.

The properties of commercially available hydroprocessing catalyst A are set forth in Table V below. Catalyst A is an available state of the art catalyst sold for use in hydroprocessing resid oils. Catalyst A, which is American Cyanamid HDS-1443B catalyst, is referred to in this specification as the standard reference catalyst.

Pore structure values set out in Tables IV and V were determined using Micromeritic Autopore 9220 V 2.03 Mercury Porosimetry Instrument.

TABLE V
ALUMINA BASED CATALYST AS CONTROL EXAMPLE

| Catalyst | A |
|---|---|
| Impreg. Sol'n. | Ni—Mo |
| $MoO_3$, wt. % | 11.5–14.5 |
| NiO wt. % | 3.2–4.0 |
| Pore Volume Distribution by Hg Porosimetry, Surface Area by $N_2$BET | |
| Total PV, cc/g | 0.74 |
| PV >250Å, % TPV | 33.8 |
| PV >160Å, % TPV | 37.8 |
| PV <160Å, % TPV | 62.2 |
| PV <100Å, % TPV | 58.1 |
| PV 100–160Å, % TPV | 4.1 |
| PM at (dv/dD) max Å | 50 |
| PM (BET), Å | 46 |
| Surf. Area, m²/g | 314 |
| HDS-MAT, $C_{0.5}$, % | 73 |
| Metals Distribution by XPS Analysis | |
| $(Mo/Al)_{int}$ | 0.09 |
| $(Ni/Al)_{int}$ | 0.012 |
| Mo Gradient | 1.2 |
| Ni Gradient | 1.6 |

A preferred feature of the catalyst composition of the instant invention is that the above-described oxide of molybdenum, preferably $MoO_3$, is distributed on the above-described porous alumina support in such a manner that the molybdenum gradient of the catalyst has a value of about 1.0 to about 10.0, preferably about 1 to about 5. As used in this description and in the appended claims, the phrase "molybdenum gradient" means that the ratio of a given catalyst pellet exterior molybdenum/aluminum atomic ratio to a given catalyst pellet interior molybdenum/aluminum atomic ratio has a value of less than 6.0, preferably 1.0–5.0, the atomic ratios being measured by X-ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data on both catalyst pellet exteriors and interiors were obtained on an ESCALAB MKII instrument available from V. G. Scientific Ltd., which uses a 1253.6 electron volt magnesium X-ray source. Atomic percentage values were calculated from the peak areas of the molybdenum $3_{p3/2}$ and aluminum $2_{p3/2}$ signals using the sensitivity factors supplied by V. G. Scientific Ltd. The value of 74.7 electron volts for aluminum was used as a reference binding energy.

To determine the molybdenum/aluminum atomic ratio of a given catalyst pellet exterior for the catalyst of the instant invention, the catalyst pellets were stacked flat on a sample holder, and subjected to ESCA analysis. For the catalyst of the instant invention the molybdenum/aluminum atomic ratio of the catalyst pellet exterior is in the range of 0.12–2.0, preferably 0.15–0.75. This exterior molybdenum/aluminum atomic ratio is considerably greater than the Mo/Al catalyst surface atomic ratio of 0.03–0.09 disclosed in U.S. Pat. No. 4,670,132.

To determine the molybdenum/aluminum atomic ratio of a given catalyst pellet interior for the catalyst of the instant invention, the catalyst pellets were crushed into a powder, placed firmly in a sample holder, and subjected to ESCA analysis. For the catalyst of the instant invention, the molybdenum/aluminum atomic ratio of the catalyst pellet interior (i.e., the molybdenum/aluminum ratio of the powder, which is assumed to be representative of the interior portion of the pellet) is in the range of 0.10–0.20, preferably 0.11–0.18.

The molybdenum/aluminum atomic ratios of the total catalyst composition of the instant invention, as determined by conventional means (i.e., Atomic Absorption (AA) or Inductively Coupled Plasma (ICP) spectroscopies) is in the range of 0.060–0.075, preferably 0.062–0.071. To determine the total catalyst composition molybdenum/aluminum atomic ratio, catalyst pellets were ground to a powder and digested in acid to form an ionic solution. The solution was then measured by AA or ICP to determine Mo ion concentration, which was then adjusted to $MoO_3$ concentration. Alumina ($Al_2O_3$) concentration was back-calculated from the direct measurement of the concentration of the other components (e.g., Ni, Fe, NA, S).

The HDS Microactivity Test (HDS-MAT) was used to evaluate the intrinsic activity of catalysts in the absence of diffusion and using a model sulfur compound as a probe. The catalyst, ground to a 30–60 mesh fraction, is presulfided at 750° F. with a 10% $H_2S/H_2$ mixture for 2 hours. The presulfided catalyst is exposed to a benzothiophene-containing feed at 550° F. and flowing hydrogen for approximately four hours. Cuts are taken periodically and analyzed by a gas chromatograph for the conversion of benzothiophene to ethylbenzene. The results obtained were HDS-MAT tests as well as the Mo and Ni gradients of the catalysts described are shown in Tables III and IV.

BERTY REACTOR HYDROCRACKING CATALYST EVALUATION

The Berty reactor, a type of continuous stirred tank reactor (CSTR), was used to determine hydrocracking activities of the catalysts of this invention in a diffusion controlled regime at a low rate of deactivation. The catalysts were presulfided and then the reaction was carried out at a single space velocity for 38 hours. The sample cuts were taken every 4 hours and tested for boiling point distribution, Ni, V, S, and sediment content. Using these data, conversions for the 650° F.+ and 1000° F.+ fractions were determined. The feedstock properties and the operating conditions of the Berty reactor are listed in Table VI which follows.

TABLE VI

BERTY REACTOR OPERATING CONDITIONS

| 1. PRESULFIDING | |
|---|---|
| Temperature | 750°–800° F. |
| Pressure | 40 psig |
| Gas Mixture | 10 Vol % $H_2S$ - 90 Vol % $H_2$ |
| Gas Flow | 500 SCCM |
| Duration | 2 Hr., 45 Min. |
| 2. FEEDSTOCK | 60 Vol % Desulfurized VGO |
| | 40 Vol % Ar M/H Vac. Resid |
| Boiling Point Distribution | IBP 444° F. |
| | FPB 1371° F. |
| | 650° F.+ 89.2 Vol % |
| | 900° F.+ 45.6 Vol % |
| | 1000° F.+ 33.5 Vol % |
| Sulfur wt % | 2.2 |
| Ni Content, ppm | 20 |
| V Content, ppm | 54 |
| 3. REACTION CONDITIONS | |
| Temperature | 805° F. |
| Pressure | 1000 psig |
| Hydrogen Feed Rate | 300 SCCM |
| Liquid Feed Rate | 82.5 CC/Hr |
| Liquid Holdup | 125 CC |
| Catalyst Charge | 36.9 Grams |

The hydrocracking activity was determined by comparing the percentages of products in the 650° F.− fraction and 1000° F.− fraction when various catalysts were evaluated under constant mild hydrocracking conditions with the same feedstock. The conversions of 650° F.+ and 1000° F.+ were calculated by the equations below:

$$\text{Conversion} = \frac{Y(F) - Y(P)}{Y(F)} \times 100\%$$

Y(F) denotes the volume percentage of the 650° F.+ or 1000° F.+ fraction in the feedstock.

Y(P) denotes the volume percentage of the 650° F.+ or 1000° F.+ fraction in the products.

The boiling point distribution of the total product was determined using the ASTM D-2887 Method, Simulated Distillation by Gas Chromatography. The existent sediment content in the total product was measured by using the IP 375/86 Method, Total Sediment in Residual Fuels. The Total Sediment is the sum of the insoluble organic and inorganic material which is separated from the bulk of the residual fuel oil by filtration through a filter medium, and which is also insoluble in a predominantly paraffinic solvent.

Data listed in Table VII, which follows, show the activity results achieved with Catalyst SN-6447, SN-6448 and SN-6572 which are catalysts of this invention compared to the activities exhibited by Catalyst A (the reference catalyst) and Catalyst B, which are commercially available hydroprocessing catalysts, as determined in the Berty Reactor tests.

The data of Table VII show that Catalyst SN-6447 exhibits a 650° F.+ conversion value substantially greater than Catalyst A although less than Catalyst B; a 1000° F.+ conversion value substantially greater than Catalyst A and less than Catalyst B; a sediment value less than Catalyst A and substantially lower than Catalyst B. Catalyst SN-6447 exhibits an HDS activity about equal to Catalyst A and substantially greater than Catalyst B.

With regard to Catalyst SN-6448, the data presented in Table VII show that this catalyst exhibits a 650° F.+ conversion value substantially greater than Catalyst A and less than Catalyst B; a 1000° F.+ conversion value substantially greater than Catalyst A and about equal to Catalyst B; a sediment value equal to Catalyst A and significantly less than Catalyst B and an HDS activity about the same as Catalyst A and substantially greater than Catalyst B.

As shown in Table VII, Catalyst SN-6572 exhibits a 650° F.+ conversion value substantially greater than Catalyst A and less than Catalyst B; a 1000° F.+ conversion value substantially greater than A and slightly greater than Catalyst B; a sediment value equal to Catalyst A and significantly less than Catalyst B, and HDS activity about the same as Catalyst A and substantially greater than Catalyst B.

TABLE VII

BERTY RESID MILD HYDROCRACKING ACTIVITIES TEMPERATURE TEST RESULTS

| Catalyst | 650° F.+ Conversion Vol % | 1000° F.+ Conversion Vol % | IP Sediment % | HDS Activity % |
|---|---|---|---|---|
| A | 29 | 78 | 0.7 | 69 |
| B | 47 | 86 | 1.0 | 63 |
| * SN-6447 | 36 | 80 | 0.5 | 70 |
| * SN-6448 | 42 | 84 | 0.6 | 74 |
| * SN-6572 | 43 | 87 | 0.7 | 70 |

Run conditions: Temperature = 805° F., Pressure = 1000 Psig, LHSV = 0.66, Hydrogen Flow Rate = 300 SCC/M, and the feedstock is 40 Vol % Arabian Medium/Arabian Heavy (65:35 Vol %) vacuum resid in desulfurized vacuum gas oil.
* Catalyst of the instant invention.

A comparison of the conversion advantages of Catalysts SN-6447, SN-6448 and SN-6572 as compared to conversion and sediment values for commercial hydroprocessing Catalysts A and B is set out in the data presented in Table VIII which follows.

TABLE VIII

BERTY RESID MILD HYDROCRACKING ACTIVITIES
Test Results Compared to Results with Standard Catalyst A

| Catalyst | Catalyst Type | 650° F.+ Conversion Advantage Vol % | 1000° F.+ Conversion Advantage Vol % | IP Sediment Delta % |
|---|---|---|---|---|
| A | Alumina | 0 | 0 | 0 |
| B | Zeolite-Alumina | +18 | +8 | +0.3 |
| * SN-6447 | Zeolite-Silica Alumina | +7 | +2 | −0.2 |

TABLE VIII-continued

BERTY RESID MILD HYDROCRACKING ACTIVITIES
Test Results Compared to Results with Standard Catalyst A

| Catalyst | Catalyst Type | 650° F.+ Conversion Advantage Vol % | 1000° F.+ Conversion Advantage Vol % | IP Sediment Delta % |
|---|---|---|---|---|
| * SN-6448 | Zeolite-Alumina[1] | +13 | +6 | −0.1 |
| * SN-6572 | Zeolite-Alumina[1] | +14 | +9 | 0 |

Run conditions: Temperature = 805° F., Pressure = 1000 Psig, LHSV = 0.66, Hydrogen Flow Rate = 300 SCC/M, and the feedstock is 40 Vol % Arabian Medium/Arabian Heavy (65:35 Vol %) vacuum resid in desulfurized vacuum gas oil.
* Catalysts of the instant invention.
[1] Alumina employed was precipitated alumina.

The data presented in Table VIII show that Catalyst SN-6447, a catalyst of the instant invention, exhibits an increase of 7 Vol % in 650° F. conversion or about 24% improvement in relative conversion over that achieved with Catalyst A (i.e., the standard base commercial catalyst). Catalyst SN-6447 also gave an improvement in the 1000° F.+ conversion (2 Vol %) or about 3% improvement in relative conversion over that achieved with Catalyst A. The IP sediment make for Catalyst SN-6447 showed an appreciable decrease over the sediment make of Catalyst A and a substantial decrease in the sediment make of Catalyst B.

With regard to Catalyst SN-6448 the data in Table VIII show that an increase of 13 Vol % in the 650° F.+ conversion value (Or about 45% improvement in relative conversion over that achieved with Catalyst A) and in the 1000° F.+ conversion value Catalyst SN-6448 gave a 6 Vol % improvement or about 8% in relative conversion over Catalyst A while the IP sediment value decreased 0.15 over Catalyst A.

The data in Table VIII show that with regard to Catalyst SN-6572 an increase of 14 Vol % in the 650° F.+ conversion value or about 48% improvement in relative conversion over that achieved with Catalyst A and in the 1000° F.+ conversion Catalyst SN-6572 gave an improvement of 9 Vol % or about a 12% improvement in relative conversion over that realized with Catalyst A.

The high sediment make of Catalyst B, as the data in Table VII and Table VIII show, indicates that this catalyst would not be suitable for use in the MHC process of this invention because of a distinct tendency to cause reactor plugging.

The results set out in Table VIII clearly indicate that Catalysts SN-6447, SN-6448 and SN-6572, the zeolite-containing catalysts of the invention, substantially outperform Catalysts A and B of the prior art.

Mild hydrocracking of heavy oils containing resids in the presence of the catalyst of this invention, comprising, for example, molybdenum oxide, nickel oxide, and, optionally, phosphorus oxide on the zeolite-containing alumina support having a specified pore size distribution not only allows an increased production of middle distillate and more effective conversion of resid feedstocks but also maintains the sediment make at a low level similar to or lower than that achieved with conventional bimodal alumina based catalysts.

What is claimed is:

1. A process for mild hydrocracking of a hydrocarbon feedstock having a substantial proportion of components boiling below about 1000° F., said process comprising contacting said hydrocarbon feedstock under conditions of elevated temperature and a hydrogen pressure of less than about 1500 psig with a particulate catalyst comprising about 1.0 to about 6.0 wt. % of an oxide of a Group VIII metal; about 12.0 to about 25.0 wt. % of an oxide of molybdenum and 0 to about 5.0 wt. % of an oxide of phosphorus all supported on a porous support comprising (1) a matrix selected from the group consisting of precipitated alumina and silica-alumina containing about 1.0 to about 3.0 wt. % of silica and (2) about 5.0 to about 35 wt. %, based on the weight of the support, dealuminated Y-zeolite having a silica to alumina mole ratio of 10 to 32, a unit cell size of 24.29 to 24.48, in such a manner that the molybdenum gradient of the catalyst ranges from about 1 to about 10, said conditions being such as to yield about a 10 to about a 60 Vol % conversion of the hydrocarbon feedstock boiling above 650° F. to hydrocarbon products boiling at or below 650° F., wherein the said catalyst is further characterized by having a total surface area of about 200 to about 350 m$^2$/g and a total pore volume of about 0.55 to about 0.75 cc/g, with a pore volume distribution such that micropores having diameters less than 100 Å constitute less than 40% pores having diameters of 100–160 Å constitute about 10 to about 55%, pores having diameters greater than 160 Å constitute about 25 to about 55%, macropores having diameters greater than 250 Å constitute about 15 to about 45% of the total pore volume.

2. The process of claim 1 wherein the said hydrocarbon feedstock is contacted with said catalyst in a fixed bed reactor.

3. The process of claim 1 wherein the said hydrocarbon feedstock is contacted with said catalyst in a single ebullated bed reactor.

4. The process of claim 1 wherein the said hydrocarbon feed is contacted with said catalyst in a series of 2–5 ebullated bed reactors.

5. The process of claim 1 wherein the said hydrocarbon feed is contacted with said catalyst in a series of 2–5 continuous stirred tank reactors.

6. The process of claim 1 wherein the said hydrocarbon feed is contacted with said catalyst in a single continuous stirred tank reactor.

7. The process of claim 1 wherein the catalyst is further characterized by having about 40 to about 65% of the total pore volume in pores of diameters from about 20 Angstroms below the pore mode diameter to about 20 Å above the pore mode diameter and the pore mode diameter is in the range of about 65 to about 120 Å as measured by mercury porosimetry.

* * * * *